June 25, 1929.  M. G. P. PHILLIPS  1,718,664
MACHINE FOR STRIPPING TOBACCO LEAVES
Filed April 6, 1926  6 Sheets-Sheet 1
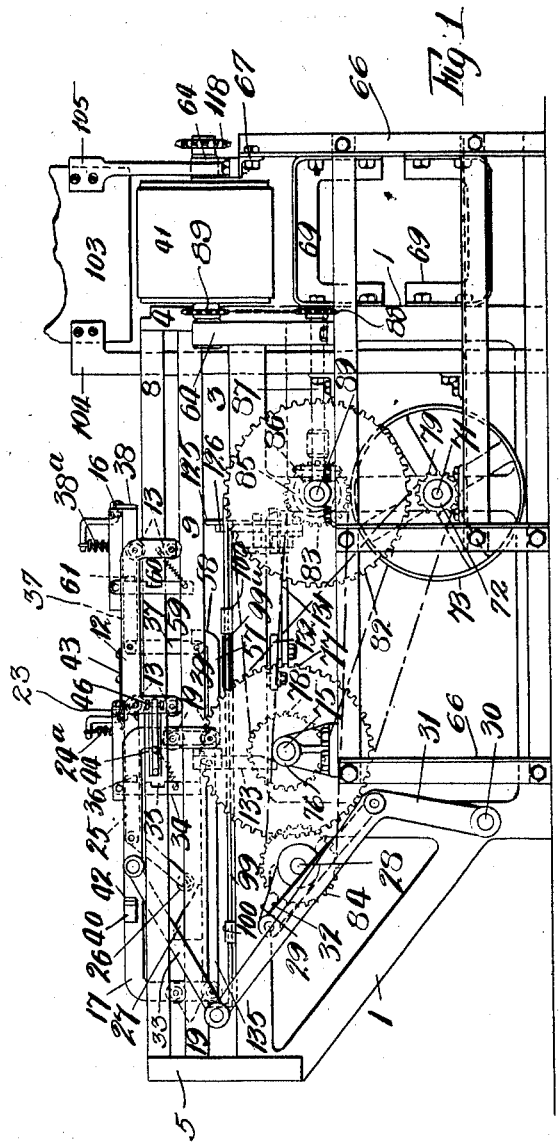
Inventor;
Morris Godfrey Philip Phillips,
By his Att'y,

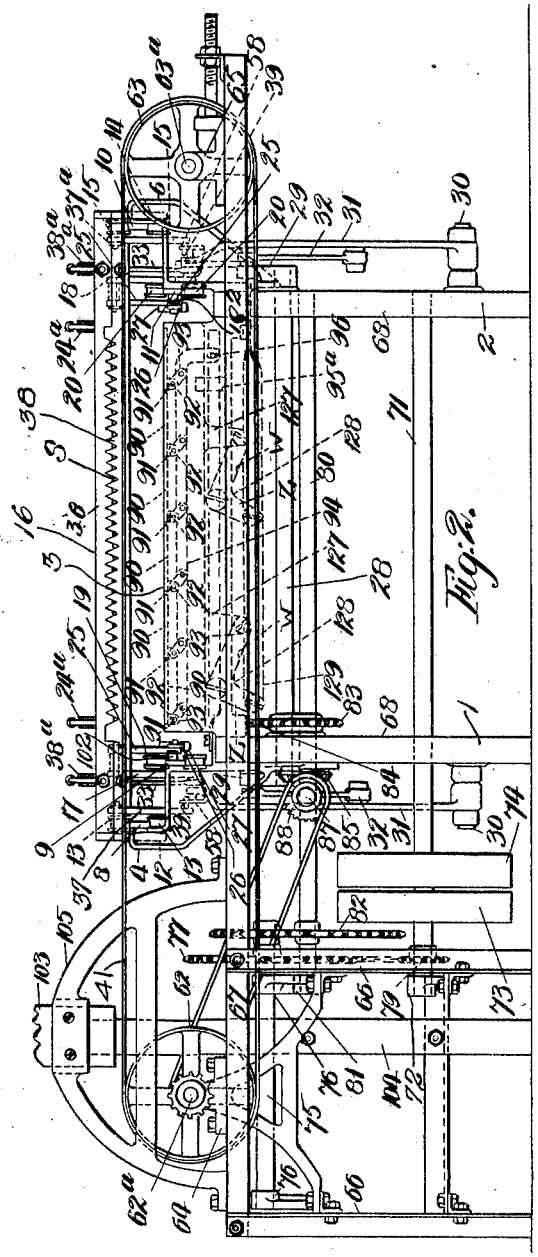

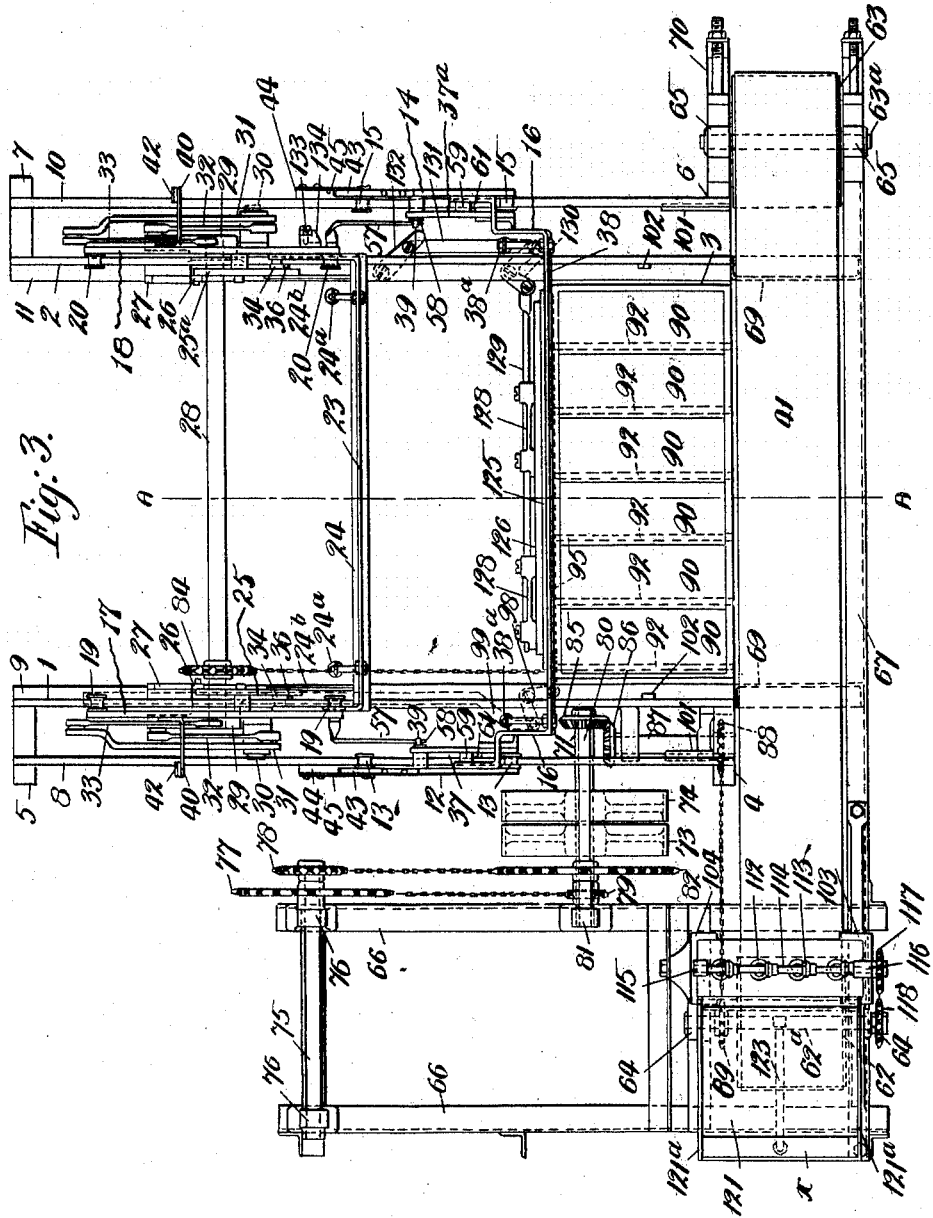

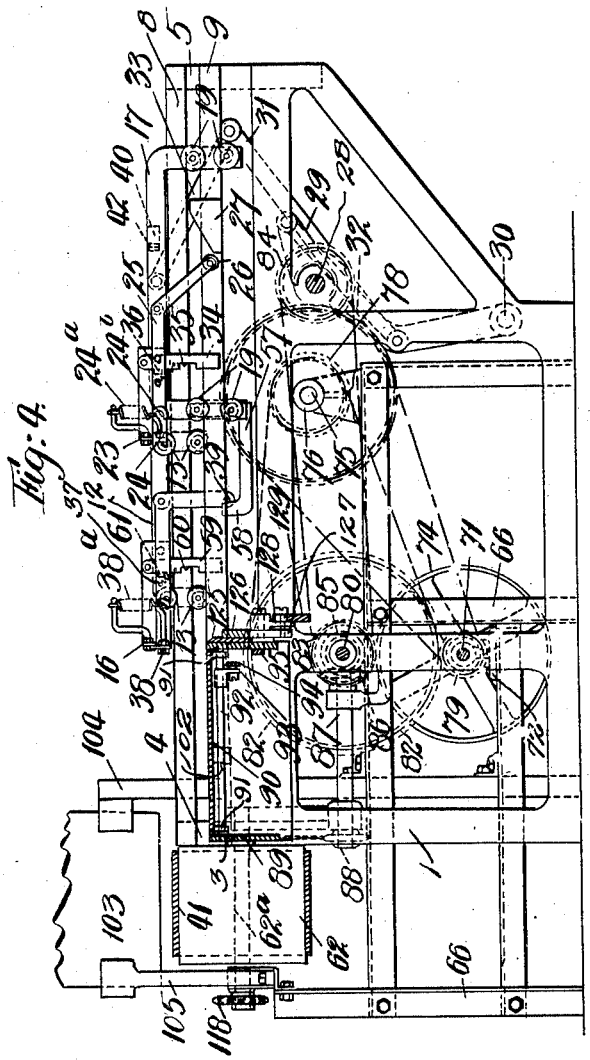

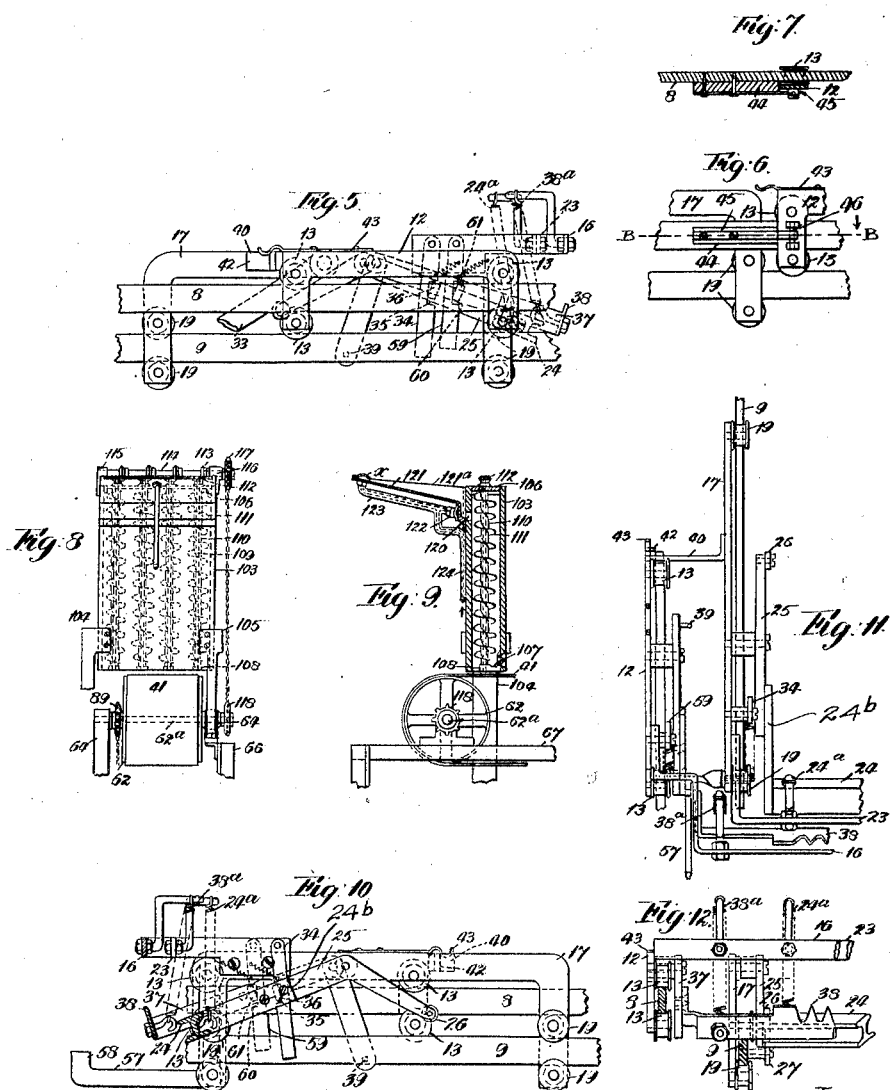

June 25, 1929.  M. G. P. PHILLIPS  1,718,664
MACHINE FOR STRIPPING TOBACCO LEAVES
Filed April 6, 1926   6 Sheets Sheet 6
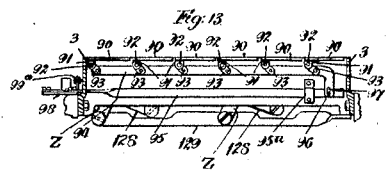
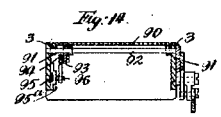
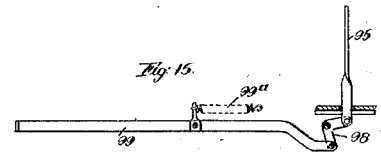
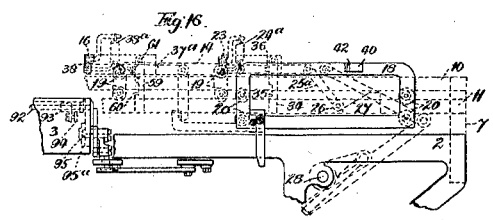
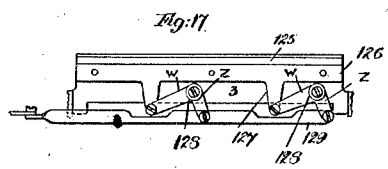
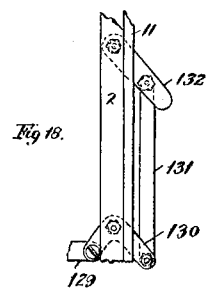
Inventor:
Morris Godfrey Philip Phillips.
By Harold D. Penney
Atty.

Patented June 25, 1929.

1,718,664

UNITED STATES PATENT OFFICE.

MORRIS GODFREY PHILIP PHILLIPS, OF LONDON, ENGLAND.

MACHINE FOR STRIPPING TOBACCO LEAVES.

Application filed April 6, 1926, Serial No. 100,087, and in Great Britain April 17, 1925.

This invention relates to an improved machine for stripping tobacco leaves and it has for its object to provide a simple and efficient machine whereby the separation of the leaf from the stem may be readily effected with a minimum of waste of tobacco.

A machine according to this invention comprises a continuous or intermittently operated belt or band upon which the leaves are placed by hand, or mechanically, with a certain length of the butt of the stem projecting. The movement of the belt carries the leaves into a position in which the projecting ends of the stem may be engaged by the stripping device, the ends of the said stems projecting sufficiently there-beyond to enable them to be grasped by a suitable gripper the said gripper drawing the stems through the stripper.

Alternatively the gripper may be arranged to move to draw the leaves through the stripper or both gripper and stripper may move together for a certain distance the gripper continuing its movement to effect the stripping.

Provision may be made for dealing with leaves having broken stems and for collecting the tobacco when stripped.

In order that the invention may be the better understood drawings are appended, in which:—

Fig. 1 is a side elevation of a machine constructed in accordance with one form of the present invention, Fig. 2 is a front elevation of the machine,

Fig. 3 is a plan,

Fig. 4 is a sectional view on line A A Fig. 3,

Fig. 5 is a view to an enlarged scale showing certain details of the gripping and stripping mechanism, Fig. 6 is a view to a larger scale of certain details shown in Fig. 1, Fig. 7 is a section on line B B Fig. 6, Fig. 8 is a side elevation of the device by means of which the tobacco leaves are fed on to the belt of the machine, Fig. 9 is a sectional view, Figs. 10 to 12 are enlarged views showing more clearly certain details of the stripping and gripping members, Figs. 13 to 15 are views more clearly showing the arrangement of the slats upon which the stripped tobacco is deposited, Figs. 16 to 18 show various details of the knife for cutting the stems.

Referring to the accompanying drawings 1 and 2 indicate frames connected together at their forward ends by means of a horizontally disposed rectangular frame 3. Secured to the frames 1 and 2 are pairs of brackets 4, 5, and 6, 7, respectively, which project somewhat above the upper edges of the said frames.

To the brackets 4, 5, of frame 1, are secured rails or guide bars 8 and 9 extending from the bracket 4 to the bracket 5. Also secured in a similar manner to brackets 6, 7, of the frame 2 are rails 10 and 11.

12 indicates a body of substantially inverted U-shaped outline which is slidably mounted by means of pairs of rollers 13, 13, upon the rail 8.

14 is a body of similar size and outline to the body 12 and is slidably mounted upon the rail 10 by means of pairs of rollers 15, 15.

Extending from the forward end of the body 12 to the forward end of the body 14 is a strip or bar 16 which, together with the bodies 12 and 14, forms a carriage capable of backward or forward motion along the rails 8 and 10, the said member 16 acting as the upper member of the stripping device which will be hereinafter described.

17 and 18 are bodies of a similar shape to the bodies 12 and 14 the body 17 being slidably mounted upon the rail 9 by means of pairs of rollers 19, 19, and the body 18 being also slidably mounted by means of pairs of rollers 20, 20, upon the rail 11. 23 indicates a bar which extends from the forward end of body 17 to the forward end of body 18 and is secured to each of the bodies, the bodies 17 and 18, together with the bar 23, comprising a carriage movable upon the rails 9 and 11.

Disposed beneath the bar 23 and normally contacting therewith, is a bar 24 which may be of H-cross sectional outline which is held in its upper or normal position by means of springs 24ª, 24ª, and which, together with the bar 23, constitutes the gripping device.

The bar 24 is connected at its left and right hand ends by means of members 24ᵇ to the horizontal members of bell-crank levers 25, 25ª, respectively, the lever 25 being pivoted to the body 17, the lever 25ª being pivoted to the body 18.

The rearward and downwardly extending members of the bell crank levers 25, 25ª, are each provided with rollers 26 so disposed that when the bodies 17 and 18 of the carriage are moved into their rearmost positions the said rollers engage with cams 27 disposed upon the rails 9 and 11.

28 indicates a shaft journaled in bearings carried by the frames 1 and 2 which has at its ends a crank 29.

Pivoted upon each of the frames 1 and 2 at 30 is the lower end of a lever 31 the cranks 29 being connected to the levers 31 by means of links 32. The upper ends of the levers 31 are connected by means of links 33 to the respective bodies 17, 18, the arrangement being such that when motion is applied to the shaft 28 the bodies 17 and 18 are given a reciprocatory motion along the rails 9 and 11 and carry the gripping device with them. Upon the gripping device being moved into its rearmost position the rollers 26 upon the bell crank levers 25, 25ª, coact with cams 27 causing the lower bar 24 of the gripping device to be moved away from the bar 23 against the action of the springs 24ª, 24ª.

Pivotally connected to and depending from the ends of the member 23 are spring actuated trip levers 34 provided upon their forward faces with square recesses such as 35, so disposed that when the bell crank levers 25, 25ª, cause the separation of the bar 24 from the bar 23 the said bar 24 becomes locked in its lowermost position owing to the fact that projections 36, located upon the bell crank levers, engage with the recesses 35.

37, 37ª indicate bell crank levers pivoted to the bodies 12 and 14 respectively and which have secured to their forward ends the extremities of a notched or toothed bar 38 which is under the action of springs 38ª and is thereby normally held in such a position that the teeth are adjacent to the front of the bar 16, and are so disposed that spaces S, Fig. 2, are formed between the bottom of the teeth and the bottom of the bar 16.

Preferably the active surfaces of either or both of the bars 23 and 24 are covered with india rubber or other elastic or yielding material to accommodate stalks of different diameter.

In order to avoid any possibility of the leaves fouling the stripper and gripper members, such as might occur should the stem of the leaf be bent, both members of the said stripper and gripper may move to permit the passage of the leaf between them.

The rear ends of the bell crank levers 37, 37ª, normally extend vertically downwards and are each provided with a pin 39.

To each of the bodies 17 and 18 are secured brackets 40 which extend therefrom at a right angle and are of such length that when the bodies 17 and 18 have travelled forward a certain distance they contact with the rear limbs of the bodies 12 and 14 thereby pushing the said bodies, together with the stripping device, forward towards the feed belt 41 which traverses the front of the machine.

42 indicate ramps secured upon the brackets 40, and 43 indicate springs secured upon the rear portion of the bodies 12 and 14 which spring over the ramps 42 when the brackets 40 contact with the bodies 12 and 14.

When the bodies 17 and 18 move towards the rear of the machine the bodies 12 and 14 are pulled rearward also until the rear limbs of the bodies 12 and 14 come into contact with projections 44 upon the rails 8 and 10 when the bodies 17 and 18 continue their rearward motion and the ramps 42 are forced from beneath the springs 43.

In order that the bodies 12 and 14 may be retained against the projections 44 the said projections are provided with springs 45 which spring over ramps 46 Fig. 1, upon the rear limbs of the bodies 12 and 14 as they contact with the said projections.

To each of the front limbs of the bodies 17 and 18 are secured bodies 57 which extend in a forward direction and have their forward ends upturned as indicated at 58, the purpose of the projections being to engage with the pins 39 of the bell crank levers 37, 37ª as the bodies 17 and 18 move into their rearmost position thereby causing the lower bar 38 of the stripping device to be moved away from the upper bar 16 against the action of the springs 38ª, in which position it is retained by means of spring actuated trip levers 59 pivoted at their upper ends to the extremities of the bar 16 and provided upon their forward edges with recesses such as 60 with which engage projections 61, which are disposed upon the bell crank levers 37, 37ª.

The belt 41 is carried upon pulleys 62, 63, which are mounted upon shafts 62ª, 63ª, respectively, the pairs of bearings 64, 64, and 65, 65, carrying the respective shafts.

The bearings 64 are mounted upon a frame work 66 which is built up of suitable girders, one girder 67 of which extends across the front of the machine where it is supported by means of uprights 68 which are secured to the frames 1 and 2 by bodies 69.

One of the bearings 65 which carries the shaft 63ª is mounted upon the girder 67, the other bearing 65 being mounted on a bracket 70 secured to the frame 2 both brackets being so mounted that their position may be varied for the purpose of adjusting the tension upon the belt 41.

71 indicates the main drive shaft of the machine which is supported in bearings formed in frames 1 and 2 and in a bearing 72 bolted to one of the cross-members of the frame work 66.

73, 74, indicate fast and loose pulleys mounted upon the shaft 71, the pulley 73 being the main driving pulley.

75 indicates a counter shaft mounted in bearings 76 at the rear end of the frame 66 and upon the inner end of which is mounted chain wheels 77, 78, the said counter shaft being driven from the main shaft 71 by means of a chain which passes around a chain wheel 79 upon the main shaft and around the chain wheel 77 upon the counter shaft. A third shaft 80 is provided which is supported in a bearing formed upon frame 1 and in a bearing 81 mounted upon a member of the frame work 66.

The shaft 80 has mounted thereon a chain wheel 82 and the said shaft is driven from the counter shaft 71 by means of a chain which passes around the chain wheels 78 and 82.

83 indicates a chain wheel mounted upon the shaft 80 from which motion is imparted by means of a chain to a chain wheel 84 secured upon the shaft 28 whereby the said shaft 28 is driven.

85 indicates a bevel wheel mounted upon the shaft 80 which engages with a second bevel wheel 86 mounted upon a shaft 87 journalled in suitable bearings carried by the frame 1.

Disposed upon the forward end of the shaft 87 is a chain wheel 88 from which motion is imparted by means of a chain to a chain wheel 89 secured upon the shaft $62^a$ thereby driving the feed belt 41.

Disposed at the top of frame 3 and extending from the front to the rear thereof are a series of slats 90 having on their undersides lugs 91 by means of which the slats are secured to shafts 92 journalled at each end in the walls of the frame 3.

93, Figs. 13 and 14, indicate levers the upper ends of which are secured upon the shafts 92 the lower ends being pivotally connected to a horizontally disposed bar 94 having one of its ends off-set at a right angle and projecting downwards.

95 is a bar or rod one end of which passes through the side of the frame 3 and the other end of which is slidably supported in a bearing $95^a$ secured upon the inside of the frame 3.

The bar 95 is provided at one end with a pin 96 which projects therefrom and engages a slot 97 formed in the lower end of the off-set portion of the bar 94, the other end of the said bar being pivotally connected to one end of a bell-crank lever 98 pivoted upon the upper edge of frame 1.

99 indicates a strip or bar under the action of a spring $99^a$ and is slidably supported in bearings 100 secured to the upper edge of frame 1, the forward end of which is pivotally connected to the end of the bell crank lever 98, the rear end of the bar 99 is bent up at a right angle.

When the body 17 is moving into its rearmost position the rear limb of the said body contacts with the upturned end of the bar 99 and pulls the said bar against the action of the spring $99^a$ thus causing the slats to open until body 17 moves forward.

Located upon brackets 4 and 6 are projections 101 which project into the path of the trip levers 59 in order that as the stripping device moves into its foremost position the said trip levers are knocked out of engagement with the projections 61 of the bell crank levers 37, $37^a$ for the purpose of allowing the bar 38 to move upward under the action of springs $38^a$ into its normal position.

Secured to the forward ends of the rails 9 and 10 are projections 102 so disposed that the trip levers 34 contact therewith as the gripping device moves into its foremost position for the purpose of knocking the trip levers 34 out of engagement with the projections 36 of the bell crank levers 25, $25^a$ and allowing the lower bar 24 of the gripping device to move upward under the action of the springs $24^a$ and contact with the upper bar 23.

103 indicates a rectangular box-like structure extending across the belt 41 and supported by means of brackets 104, 105, bolted to the frame work 66, which box is provided at its upper end with a closure 106.

Disposed within the lower end of the box 103 are brackets 107 secured to the inner wall of the said box by means of screws, the said brackets being provided at their ends with bearings 108.

109 indicates shafts the upper ends of which extend through bearings formed in the closure 106, the lower ends of said shafts being supported in the bearings 108.

Upon the shafts 109 are secured sleeves 110 carrying helices 111 each of the shafts being provided at its upper end with a bevel wheel 112 which engages with a bevel wheel 113 mounted upon a shaft 114 journalled in bearings 115, 116.

117 indicates a sprocket wheel secured upon the forward end of the shaft 114 motion being imparted to the said shaft and consequently to the helices 111 by means of a chain driven from a further sprocket wheel 118 secured upon the shaft $62^a$.

Extending across one side of the box 103 at the upper portion thereof is a slot 120 into which the tobacco leaves are blown by means of compressed air, in a manner hereinafter more fully described, or by means of a belt.

121 indicates an inclined plate forming the bottom of a receptacle having side walls $121^a$ and designed to receive the tobacco leaves. The plate, at its inner end, is provided with a vertical wall disposed in spaced relationship to the outer surface of the outer wall of the box 103 whereby there is formed a trough 122 the bottom of which is on a level with the slot 120 before referred to.

123 indicates a compressed air supply fed by the tube 124 and supplying compressed air at $x$ to the upper end of the plate 121 so that the leaves when placed thereon are impelled down the said plate and fall into the trough 122 where they are subject to the action of a second current of air which causes them to pass through the slot 120 into the feed device.

The leaves when they enter the box 103 are supported by the helices 111 which are so adjusted and synchronized as to afford a practically continuous support for the whole length of the leaf, their action, moreover, being to move the leaf endwise so that the end of the stalk bears againts the end of the box and the leaf is thus correctly positioned so that it falls on to the belt with the desired amount of overhanging for the stalk.

If desired the top of the box 103 may be open and the leaves fed thereto by hand, or by means of a belt.

In order to ensure the endwise movement of the leaves as just before described the upper surfaces of the helices which contact with the leaf may be knurled, roughened or otherwise treated to ensure the desired longitudinal movement of the leaves.

Instead of arranging the helices in the vertical plane they may be horizontally disposed and arranged with their axes longitudinally of the belt.

Instead of compressed air steam or hot air may be employed for moving the leaves or the air moistened.

As the leaves of tobacco are deposited upon the belt they are carried along by the said belt with their stalks extending over the rear edge of the belt, the said stalks extending between the bars 16 and 38 of the stripping device which are separated and moving along towards the belt.

When the stripping device moves into its foremost position over slats 90 the bar 38 is caused to swing upward under the action of the springs 38ª owing to the fact that the trip levers 59 engage with the projections 101 of the brackets 4 and 6 and are thereby pushed out of engagement with the projections 61 of the bell crank levers 37, 37ª.

The tobacco leaves then lie upon the belt with their stalks projecting through the spaces S formed between the bar 16 and the bottom of the teeth of the bar 38 as previously described.

After the bar 38 has moved up as above described the lower bar 24 of the gripping device becomes unlocked and moves upward under the action of the springs 24ª owing to the fact that the trip levers 33 contact with the projections 102 upon the rails 9 and 11 whereby the said trip levers become disengaged from the projections 36 of the bell crank levers 25, 25ª with the result that the ends of the stalks are gripped between the bars 23 and 24 of the said gripping device. The gripping device then commences to move towards the rear of the machine and owing to the fact that the springs 43 are in engagement with the ramps 42 of the brackets 40 the stripping device is drawn rearward until it is adjacent the rear edges of the slats 90 when the rear limbs of the bodies 12 and 14 come into contact with the projections 44 disposed upon the rails 8 and 10 and the ramps 42 move out of engagement with the springs 43 and the gripping device continues its rearward motion pulling the stalks or stems of the leaves through the openings S with the result that the leaves are stripped from their stalks and fall upon the slats 90. The gripping device then moves into its rearmost position with the result that the upturned ends 58 of the bodies 57 engage with the pins 39 of the bell crank levers 37, 37ª thereby operating the bell crank levers to cause the bar 38 to move downwards where it becomes locked in the manner already described. During this period the rollers 26 move into engagement with the cams 27 disposed upon the rails 9 and 11 with the result that the bell crank levers 25, 25ª, are actuated to cause the bar 24 to move downwards away from the bar 23 where it becomes locked in the manner previously described whilst the stalks are released and fall to the ground or into a suitable receptacle placed beneath the machine. The rear limb of the body 17 has, during this time, moved into engagement with the bent up portion of the rear end of the bar 99 with the result that the slats 90 are opened against the action of the spring 99ª allowing the stripped portions of the leaves to fall through the frame 3 into a suitable receptacle placed underneath. The gripping device and the stripping device again move forward in the manner previously described and the cycle of operations in repeated.

Throughout the foregoing description it has been assumed that the feed belt is continuously operated, but the motion of said belt may be intermittent the movement being controlled by the stripper which as it moves into position adjacent the belt may actuate clutch or striking gear controlling said belt. Under these circumstances the operation of the feed mechanism would also be intermittent.

Provision may be made whereby when the stems have been through the stripper to the desired extent, for example for some three or four inches, a rotary brush is caused to engage the leaves upon the table and sweeps away those portions of leaves and stalks which owing to the stalk being broken are not engaged by the gripper. The portions swept away by the brush are caught in a suitable receptacle.

The operation of the brush just referred to, to cause it to move on to and away from the table, is preferably controlled by the gripper said movement taking place when the motion of the gripper is arrested and when the leaves have been drawn through the stripper to the extent previously specified.

Instead of a brush such as just described for removing parts of the leaf where the stem is broken, a bar may be provided running longitudinally of the belt having its upper surface on a level with or slightly above the level of the said belt. A second bar is provided movable towards and away from the first bar and pressing upon the stems of the leaves as they are drawn between the two bars, the pressure, which is preferably capable of adjustment, being such that that portion of the leaf beyond the break in the stem will be detached and remaining on the belt be deposited in a box below the end of the belt's travel.

The active surface of the movable bar may be provided with a brush or other surface designed, whilst lightly engaging the stem, to impose sufficient resistance to the passage of the leaf to detach the broken portion as aforesaid.

The belt may be in two parts having a space between them sufficient to accompany the lower bar.

Alternatively in place of the upper bar a rotary brush may be employed.

The stalks may be severed by means of a swinging knife blade or a pair of blades having a shearing or scissor like action respectively, said blade or the like being disposed transversely of the line of movement of the grippers and arranged to come behind the stripper when same is in its extreme rearmost or other position, and, if desired, its operation may be controlled by the gripper.

The moment when the knife is actuated is controlled in accordance with the outward movement of the gripper.

The arrangement for effecting this may comprise a knife 125 disposed at the rear of the frame 3 and secured to a bar 126 which is provided with downwardly extending lugs 127 pivotally connected to the member w of bell crank levers 128, Figs. 1 to 4, the said bell crank levers 128 being pivotally mounted by means of screws upon the rear wall of the frame 3.

Pivoted to and connecting the ends z of the bell crank levers 128 is a bar 129 one end of which is connected to one end of a bell crank lever 130 pivoted upon the frame 2.

The other end of the bell crank lever 130 is connected by a bar 131 to a lever 132 also pivoted upon the frame 2 and so disposed that its end projects into the path of the lower end of a lever 133 pivoted at its upper end to a bracket 134 secured upon a bar 135 extending between the vertical limbs of the body 18.

The shape of the bracket 134 is such that upon the forward motion of the body 18 the lower end of the lever 133 merely rides over the end of the lever 132, but upon the rearward movement of the body 18 it operates the lever 132 and causes the knife 125 to move up over the rear face of the bar 16 of the stripping device, and transversely of the stalks.

Generally, however, it is assumed that the stalks will not require to be cut, in which case provision is made whereby the said knife may be thrown out of action.

It will be understood that the rotary brush before referred to is raised clear of the table before the gripper continues its outward movement.

Provision may also be made for removing the stems for which purpose a rotary or other brush may be provided which, when the gripper is opened on approaching its limit of outward movement may engage the stems and remove them from the gripper.

Instead of the gripper comprising plates two knurled or roughened or rubber covered rollers may be employed which are rotated to draw the stems there-between or separated to permit the passage of the stems after which they close thereon and grip same.

The rollers, at the end of their travel, to draw the stems through the strippers are rotated to discharge the stems.

Alternatively the rollers may be stationary and be rotated to draw the stems through the stripper which also may be stationary.

If desired the rollers may rotate during their outward movement with the stripper.

The rotation of the rollers may be effected by means of cog wheels on the spindles of the rollers engaging a fixed rack.

In order to free the stripper from particles of leaf, stem or other matter, the outer ends of the slats upon the table may be provided with brushes which, as the slats are turned into their upper position, sweep over the stripper, or any other suitable provision may be made for this purpose.

Throughout the foregoing description it has been assumed that the leaves are drawn from the belt prior to the stripping operation being effected. The stripping may, however, be effected whilst the leaves are upon the belt in which case the grippers only would have movement towards and away from said belt, the motion of the belt being intermittent, the tobacco falling upon the belt by which it is carried away being collected at a suitable point.

Claims:

1. A machine for stripping tobacco leaves including a moving support for the leaves, means for feeding said leaves on to said support with their ends overhanging same, a stripper movable towards and away from said support and engaging the stems of the leaves, a gripper also movable towards and away from said support and engaging the stems of said leaves adjacent the butt ends thereof, means coupling said stripper and gripper for cooperation of the stripper and gripper to draw the leaves from said support, and means for disconnecting said stripper and gripper whereby the gripper draws the stems of said leaves through the stripper.

2. A machine for stripping tobacco leaves including a moving support for the leaves, means for feeding said leaves on to said support, a stripper movable towards and away from said support and engaging the stems of the leaves, a gripper also movable towards and away from said support and engaging the stems of said leaves adjacent the butt ends thereof, said stripper embodying a fixed member and a member movable towards and away from said fixed member, projections upon said movable member having spaces between them for the passage of the stems therethrough, means coupling said stripper and gripper for cooperation of the stripper and gripper to draw the leaves from said support, and means for disconnecting said stripper and gripper whereby the gripper draws the stems of said leaves through the stripper.

3. A machine for stripping tobacco leaves including a moving support for the leaves, means for feeding said leaves on to said support, a stripper movable towards and away from said support and engaging the stems of the leaves, a gripper also movable towards and away from said support and engaging the stems of the leaves adjacent the butt ends thereof, said stripper and gripper moving together to draw the leaves off said support, said gripper then operating to draw the stems through the stripper, means for supporting the leaves when removed from the first support and including a series of pivotally mounted slats, and means for pivotally moving said slats on the completion of the stripping operation to permit the passage of stripped laminæ of the leaves between said slats.

4. A machine for stripping tobacco leaves including a moving support for the leaves, means for feeding said leaves on to said support, a stripper movable towards and away from said support and engaging the stems of the leaves, a gripper also movable towards and away from said support and engaging the stems of the leaves adjacent the butt ends thereof, means coupling said stripper and gripper for cooperation of the stripper and gripper to draw the leaves from said support, means for disconnecting said stripper and gripper whereby the gripper operates to draw the stems of said leaves through the stripper, a frame for supporting the leaves when removed from said support and including a series of pivotally mounted slats arranged transversely of the frame, and means for pivotally moving said slats on the completion of the stripping operation to permit the passage of the stripped laminæ of the leaves between the slats.

5. A machine for stripping tobacco leaves including a moving support for the leaves, means for feeding said leaves on to said support, a stripper movable towards and away from said support and engaging the leaves, a gripper also movable towards and away from said support and engaging the stems of the leaves adjacent the butt ends thereof, said stripper and gripper moving together to draw the leaves off the support, said gripper then operating to draw the stems of said leaves through the stripper, means for supporting the leaves when removed from the first support, and means operatively associated with said gripper adapted to cut the stalks carrying said leaves.

6. A machine for stripping tobacco leaves including a moving support for the leaves, means for feeding said leaves on to said support with their ends overhanging same, a stripper movable towards and away from said support and engaging the stems of said leaves, a gripper also movable towards and away from said support and engaging the stems of the leaves adjacent the butt ends thereof, said stripper and gripper moving together to draw the leaves off the support, said gripper then operating to draw the stems of said leaves through the stripper, a frame for supporting the leaves when removed from said support and comprising a series of pivotally mounted slats arranged transversely of the frame, means for pivotally moving said slats on the completion of the stripping operation to permit the passage therebetween of the stripped laminæ of the leaves, means operatively associated with said gripper for cutting the stalks of said leaves.

7. A machine for stripping tobacco leaves comprising a moving support for the leaves, means for feeding said leaves on to said support and including a case disposed transversely of the line of movement of the said moving support, a plurality of helices vertically disposed and arranged upon a line transversely of said support, means for driving said helices, an opening in said case for the introduction of the leaves, means for introducing the leaves into the case through said opening, a discharge for said leaves adjacent said moving support, the leaves being discharged from the case through said opening onto said moving support by operation of said helices, a stripping device engaging the leaves so discharged, gripping means engaging the stems adjacent the butt ends of the leaves, means for operating the stripper and gripper to draw the leaves from said support, and means for operating the gripper to draw the stems of said leaves through the stripper.

8. A machine for stripping tobacco leaves including a moving support for the leaves, means for feeding said leaves on to said support with their ends overhanging same and including a case disposed transversely of the line of movement of said moving support, a plurality of helices vertically disposed and arranged upon a line transversely of said support, means for driving said helices, an opening for the introduction of the leaves into said case, a discharge opening for said leaves adjacent said moving support, the leaves being discharged from said opening onto said support by said helices, a stripper movable towards and away from said support and engaging the leaves so discharged, a gripper also movable towards and away from said support and engaging the stems of the leaves adjacent the butt ends thereof, said stripper and gripper moving together to draw the leaves off said support, said gripper then operating to draw the stems of said leaves through the stripper.

9. A machine for stripping tobacco leaves including a moving support for the leaves, means for feeding said leaves on to said support and including a case disposed transversely of the line of movement of the said moving support, a plurality of helices vertically disposed and arranged upon a line transversely of said support, means for driving said helices, an opening in said case for the introduction of the leaves into said case, an inclined surface adjacent said opening, a well at the end of said surface adjacent said opening, means for causing a current of air to pass over said surface and propel the leaves into said well, means for causing a current of air to pass across said well to carry said leaves into said opening on to said helices, a discharge opening in said case for said leaves adjacent said moving support, the leaves being discharged by the helices through said opening onto said support, a stripping device engaging the leaves so discharged, gripping means engaging the stems adjacent the butt end of the leaves, means for operating the stripper and gripper to draw the leaves from said support, and means for operating the gripper to draw the stems of said leaves through the stripper.

10. A machine for stripping tobacco leaves including a support for the leaves, a stripping device engaging the stems at a point adjacent the web of the leaf, gripping means engaging the stems adjacent the butt end of the stems, and means for reciprocating the gripping means and stripping device in one plane to engage and draw the stems of the leaves through the stripping device.

11. A machine for stripping tobacco leaves including a moving support for the leaves, means for feeding said leaves on to said support, a stripper engaging the stems at a point adjacent the web, a gripper movable towards and away from said support and engaging the stems of the leaves at the butt ends of the stems, said gripper operating to draw the stems of the leaves through the stripper, and a frame for supporting the leaves when removed from the moving support and including a series of pivotally mounted slats and means for pivotally moving said slats on the completion of the stripping operation of the stripper to permit passage of the stripped laminæ between the slats.

12. In a machine of the character described, in combination, stripping means adapted to engage the stems of tobacco leaves, means to reciprocate said stripping means, and gripping means reciprocable in the same plane as the stripping means for engaging the ends of the stems engaged by said stripping means and means associated with both said means whereby the gripping means draws the stems through the stripping means for stripping said leaves.

13. In a machine of the character described, in combination, stripping means adapted to engage the stems of tobacco leaves, means to reciprocate said stripping means and means for gripping the ends of the stems of the leaves and including a fixed member and a member movable relative to the said fixed member, said members being disposed adjacent the stripping means, said gripping means being adapted to reciprocate in the same plane as said stripping means for engaging the ends of the stems engaged by said stripping means and drawing the stems of said leaves through the stripping means for stripping the leaves.

14. In a machine of the character described, in combination, stripping means adapted to engage the stems of tobacco leaves, means for presenting the leaves to said stripping means, said stripping means being reciprocable in one plane for engaging the stems of the leaves and drawing the leaves from said presenting means, and means for gripping the ends of the stems engaged by said stripping means, said gripping means being reciprocable in the same plane as the stripping means for engaging the ends of said stems and drawing the stems through the stripping means for stripping the leaves.

15. In a machine of the character described, in combination, stripping means adapted to engage the stems of the leaves, means for presenting the leaves to said stripping means, said stripping means being reciprocable in one plane for engaging the stems of the leaves and drawing the leaves from said presenting means, and means for gripping the ends of the stems engaged by said stripping means, said gripping means being reciprocable in the same plane as said stripping means and having a reciprocating movement of greater extent than that of the stripping means for engaging the ends of said stems and drawing the stems through the stripping means for stripping the leaves.

16. In a machine of the character described, in combination, stripping means adapted to engage the stems of the leaves, means for presenting the leaves to said stripping means, said stripping means being reciprocable in one plane for engaging the stems of the leaves and drawing the leaves from said presenting means, means for gripping the ends of the stem engaged by said stripping means, said gripping means being reciprocable in one plane, and means for connecting and disconnecting the stripping and gripping means whereby they are connected for movement together in one direction of reciprocation during which the stripping means engages the stems of the leaves and draws the leaves from said presenting means and comes to rest and the gripping means is disconnected from the stripping means and by continued movement in said direction draws the leaves by their stem ends through the stripping means for stripping the leaves.

17. In a machine of the character described, in combination, stripping means including a member having a serrated edge portion each serration being adapted to engage the stem of a leaf, means cooperating with said member to retain each stem in a serration, and means for gripping the ends of the stems when the stems are engaged by the stripping means, said gripping means being reciprocable in one plane for engaging the ends of said stems and drawing the stems through the stripping means for stripping the leaves.

18. In a machine of the character described, in combination, stripping means including a member having a serrated edge portion each serration being adapted to engage the stem of a leaf, means cooperating with said member to retain each leaf in a serration, said stripping means being reciprocable in one plane, and means for gripping the ends of the stems when the stems are engaged by the stripping means, said gripping means including a fixed member and a movable member and means for moving said movable member relative to said fixed member to grip the ends of said stems engaged in said serrations, said gripping means being reciprocable in one plane and moving with said stripping means for engaging the ends of said stems and drawing the stems through the stripping means for stripping the leaves.

19. In a machine of the character described, in combination, stripping means adapted to engage the stems of leaves and reciprocable in one plane, gripping means reciprocable in one plane and moving with the stripping means for engaging the ends of the stems of the leaves engaged by said stripping means and drawing the stems through the stripping means for stripping the leaves, and means for severing the stripped stems at a predetermined point of their length.

20. In a machine of the character described, in combination, means for stripping leaves, means for gripping the stems of said leaves cooperating with the stripping means, and a frame for receiving the stripped laminæ of the leaves and including parallel slats, said slats being normally substantially in contact at their sides and movable for providing spaces between the slats for passage of the stripped laminæ through said spaces for discharge of the laminæ from the frame, said slats being moved from substantially contacting position to space forming position and returned to normal position by operation of said stripping and gripping means.

21. In a machine of the character described, in combination with a tobacco leaf stripping device, means for receiving tobacco leaves from a source of supply, a case having an inlet opening cooperating with said receiving means and having an outlet opening, rotatable means in the case for discharging the leaves from the case through said outlet opening, means for operating said rotatable means, means for providing air under compression cooperating with said leaf receiving means for propelling the leaves from said receiving means into said inlet opening, and further means for providing air under compression for propelling the leaves from said inlet opening into the case.

22. In a machine of the character described, in combination with a stripping device, means for receiving leaves from a source of supply, a case having an inlet opening cooperating with said receiving means and having an outlet opening, rotatable means in the case including helices for discharging the leaves from the case through said outlet opening, means for operating said rotatable means, means for providing air under compression cooperating with said leaf receiving means for propelling the leaves from said receiving means into said inlet opening, and means for providing air under compression for propelling the leaves from said inlet opening onto said helices, a moving support associated with said case adapted to receive the leaves from said helices and deliver them to said stripping device.

23. A machine for stripping tobacco leaves comprising in combination, a support for the leaves, means for feeding said leaves on to said support, a stripper movable towards and away from said support and engaging the stems of the leaves, and a gripper also movable towards and away from said support and engaging the stems of said leaves adjacent the butt ends thereof, means associated with said stripper and gripper and cooperating therewith to draw the leaves from said support, and means to disconnect said stripper and gripper whereby the gripper draws the stems of said leaves through the stripper.

In testimony whereof I have hereunto set my hand.

MORRIS GODFREY PHILIP PHILLIPS.